Oct. 9, 1951      R. E. BLAIR      2,570,511
APPARATUS FOR DISTRIBUTING INSECTICIDES OR POLLEN
Filed May 22, 1946      2 Sheets-Sheet 1
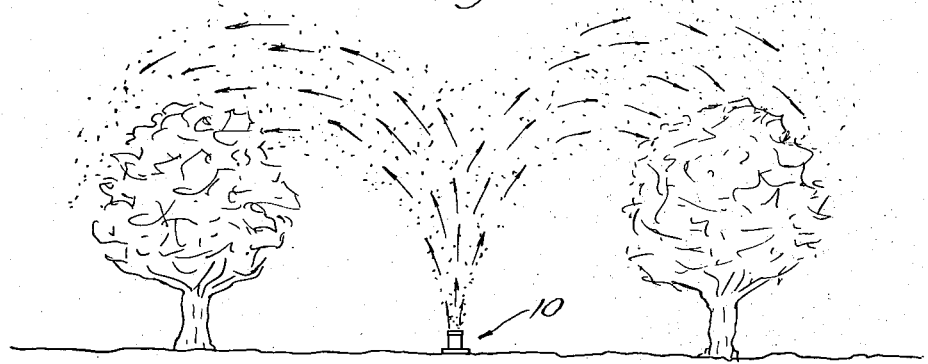
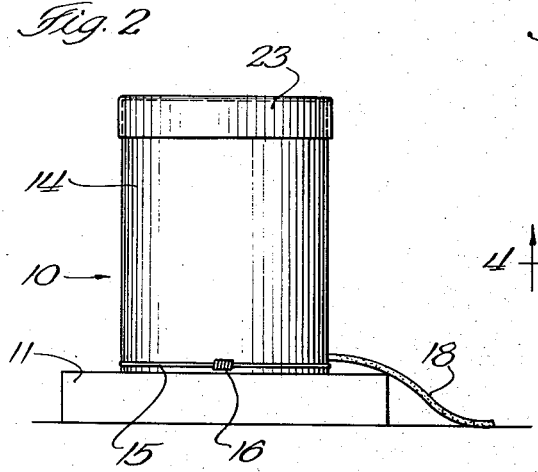 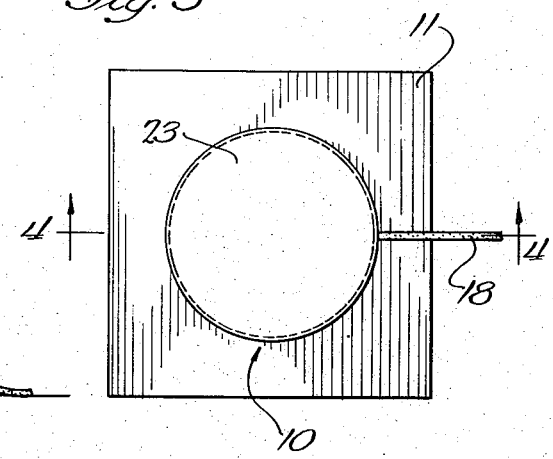
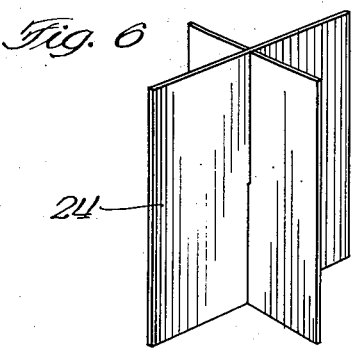
INVENTOR
Robert E. Blair
BY
ATTORNEY Oct. 9, 1951     R. E. BLAIR     2,570,511
APPARATUS FOR DISTRIBUTING INSECTICIDES OR POLLEN
Filed May 22, 1946     2 Sheets-Sheet 2
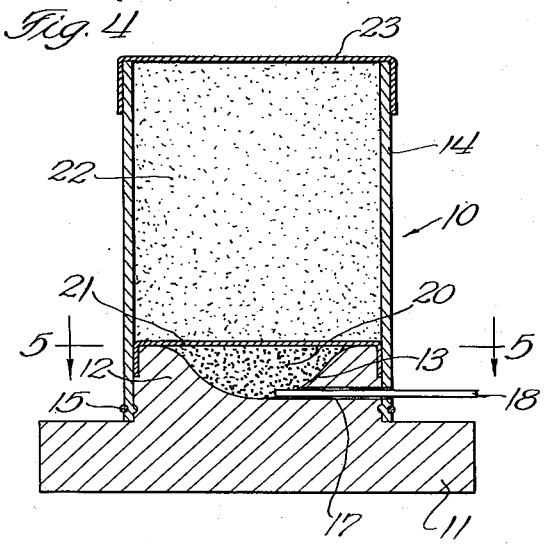
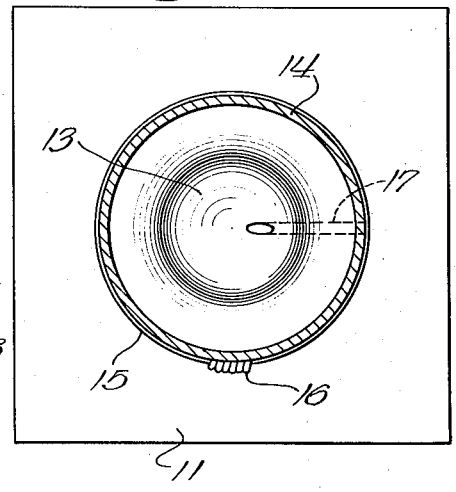
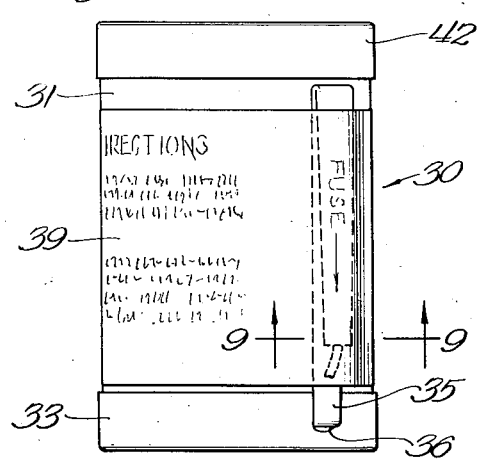
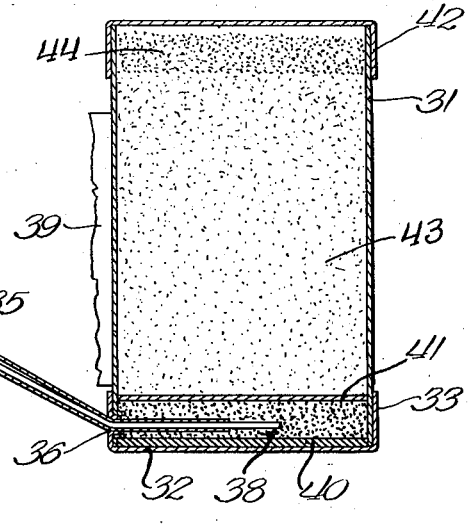
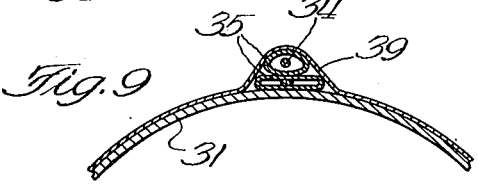
INVENTOR
Robert E. Blair
BY
ATTORNEY Patented Oct. 9, 1951

2,570,511

UNITED STATES PATENT OFFICE 2,570,511

APPARATUS FOR DISTRIBUTING INSECTICIDES OR POLLEN

Robert E. Blair, Wenatchee, Wash.

Application May 22, 1946, Serial No. 671,607

6 Claims. (Cl. 47—1)

1

This invention relates to an apparatus for distributing insecticides or pollen. It is more generally concerned with apparatus for spreading or distributing any of the various finely divided materials used in dusting trees, shrubs, etc. for pollenization, insect control, and other purposes, such materials being collectively referred to hereinafter as spray-dusts or simply as dust. The present application is in part a continuation of my co-pending application Serial No. 557,529, filed October 6, 1944 (now abandoned).

Because of the frequency with which fruit trees for example are spray-dusted each season with insecticides for the control of insects, and more recently, with pollen to assure adequate pollenization, or hormone preparations to delay the dropping of the fruit, it is desirable that there be provided simple and inexpensive apparatus which can be used by the fruit grower for any or all of these purposes.

A primary object of this invention is the provision of an improved apparatus for distributing spray-dusts whereby the dust can be lifted to a desired altitude to form a colloidal suspension in the air so that the particles thereof will be carried by air currents to the desired location.

Another object of the invention is to provide a new and improved apparatus of simple and inexpensive construction for efficiently and effectively disseminating spray-dusts.

Other objects will in part be obvious and in part be pointed out as the description of the invention proceeds with reference to the accompanying drawings, wherein there are disclosed certain preferred embodiments of the invention.

In the drawings:

Fig. 1 is a diagrammatic elevational view showing one means of employing the apparatus of the present invention, Fig. 2 is a side elevational view of one form of apparatus of the invention, Fig. 3 is a top plan view of the device shown in Fig. 2, Fig. 4 is a sectional view taken substantially along the line 4—4 of Fig. 3, Fig. 5 is a sectional view taken substantially along the line 5—5 of Fig. 4, Fig. 6 is a perspective view of a construction detail, Fig. 7 is a side elevational view of a modification of the apparatus of the present invention, Fig. 8 is a sectional elevation view of the device of Fig. 7, and Fig. 9 is a sectional view taken along line 9—9 of Fig. 7.

2

Having reference now to Figs. 1-5 of the drawings the dust projecting apparatus there illustrated is generally indicated at 10 and comprises a base block portion 11 having a centrally disposed, circular, upstanding flange portion 12 with a cup-shaped depression 13 therein. The base may be of wood or metal or any other suitable material. Secured about circular portion 12 is a sleeve 14, preferably of cardboard or similar material, which sleeve is suitably secured to the circular portion 12 of block 11 as by a wire 15 engaging a peripheral groove formed at the base of the sleeve and in the base of circular portion 12. Wire 15 is secured in related assembly about the sleeve 14 as by a twisted portion 16. A suitable bore 17 extends through sleeve 14 and flange portion 12 in the cup-shaped depression 13 and is adapted to contain a fuse 18.

Cup-shaped depression 13 is adapted to be filled with a suitable charge of explosive material 20 such as gunpowder after which there is positioned thereover a sheet 21 of frangible material, such as cellophane or the like. A desirable charge of explosive has been found to be one ounce of gun powder for each pound of spray-dust including any inert carrier per twenty feet of initial lift.

The upper receptacle or sleeve 14 is then filled with a suitable dusting material 22 of the desired type, which, if desired, may be mixed with other ingredients as will be more fully pointed out hereinafter. The material 22 is covered with a sheet 23 of any suitable material. Various types of spray-dusts may be utilized, either in powdered, dry or wet applications. When dry materials are utilized it is found that if they are mixed with a proper carrier, such as hydrated lime or talc, the relative dissemination may be increased. In wet applications which may include oil as an adhesive, a solution of the consistency of paste has been found desirable.

If desired, a guide member, or separator 24 as shown in Fig. 6 may be inserted in the sleeve 14 to separate the charge into a plurality of portions and to aid in the dissemination thereof.

After the spray-dust charge has been placed in the sleeve 14 either with or without the separator 24, the cover 23 is placed thereover. The fuse 18, having been inserted through the bore 17 into the cup-shaped depression 13 and contact made with the powder charge 20, is then lit, whereupon the resultant explosion lifts the dust to the desired height, in accordance with the powder charge, causing the material to be thoroughly dispersed. The air currents and eddies set in motion by the explosion, disseminate the dust to assure full coverage not only of the upper and under surfaces of the leaves of trees to which the dust is to be applied but also to all surrounding undergrowth.

The modification illustrated in Figs. 7–9, inclusive, is preferred from the standpoint of cost and simplicity of construction and is particularly designed to be supplied to the fruit grower charged except for the insecticide, pollen, or hormone which is to be added as required by the user.

The device illustrated in Figs. 7–9 which may be made almost entirely of cardboard or equivalent fibrous sheet material, comprises a container 30 including a cylindrical wall portion 31, corresponding in part to sleeve 14 of the device shown in Figs. 1–5, and a flanged base 32, the flange 33 of which extends a substantial distance upward along the outside of the wall 31 and is adhesively secured thereto. A suitable aperture 36 is provided extending through the flange 33 and wall 31 adjacent the bottom of the container and is adapted to receive one end of a fuse 34 and the protective tube 35 for the fuse. The fuse tube 35 may be made of one or two thicknesses of paper and is sufficiently flexible that the end thereof inserted through aperture 36 and extending a substantial distance into the container will effectively seal the aperture 36 before and during the ignition of the charge of explosive material 38 placed in the bottom of the container. The exposed length of the fuse tube 35 is adapted to be folded upwardly along the side of the container 31 and then downwardly upon itself as shown in Fig. 7 where it is secured by means of the paper wrapper 39 to form a compact unit. Suitable instruction, etc. can of course be printed on the wrapper 39. A relatively heavy disc 40 overlying the base 32 serves to reinforce the latter thereby to prevent the downward dissipation of the energy of the explosive charge on ignition thereof.

After the container has been charged with the material 38, there is positioned thereover a partition or diaphragm 41 which preferably snugly engages the inner surface of the cylindrical wall 31 and divides the container into a lower chamber for the explosive material and an upper chamber which, as the device is furnished to the user, will ordinarily be filled or partly filled with an inert spreader dust 43 such as talc, lime, cornstarch, wheat flour, or other powdered inert carrier held in place by a removable cover 42. The user can then remove the cover, add the particular insecticide, pollen, or other active material indicated at 44 which is to be sprayed onto the trees after which the cover is replaced, the wrapper 39 slit to expose the fuse 34 and the apparatus properly positioned relative to the tree or trees to be sprayed after which the fuse is lit so that the resultant explosion of the material 38 lifts and disperses the spray-dust in the manner described hereinbefore.

From the foregoing it will be seen that there is herein provided a type of apparatus for disseminating spray-dust, which is of simple and inexpensive construction and which accomplishes all the stated objects of this invention and others including many advantages of great practical utility and commercial importance.

As other embodiments may be made of this inventive concept and as many modifications may be made in the embodiments hereinbefore described and shown in the accompanying drawings, it is to be understood that all matter herein is to be interpreted merely as illustrative and not in a limiting sense.

What I claim is:

1. An apparatus for use in disseminating spray-dust comprising a block, a circular upstanding portion on said block having a cup-shaped depression therein and a bore communicating with said depression, a diaphragm covering said cup, a sleeve surrounding said circular portion, a wire retaining ring securing said sleeve to said circular portion, said sleeve having an aperture therein aligned with said bore, and a frangible cover for said sleeve.

2. Apparatus of the class described comprising a base member having an upwardly extending annular flange, a cylindrical member secured to said base member, a diaphragm disc within said member dividing the interior into an upper dust chamber and a lower chamber for a charge of explosive material, aligned openings in said cylindrical member and said flange of said base member, a fuse extending through said aligned openings, the inner end of said fuse terminating within said lower chamber.

3. Apparatus of the class described comprising a base member having an upwardly extending annular flange, a cylindrical member having one end secured to said flange of said base member, a transversely extending diaphragm disc within said cylindrical member dividing the interior thereof into upper and lower chambers, a removable closure member on the other end of said cylindrical member, aligned openings in said cylindrical member and said flange, a fuse extending through said openings, the inner end portion of said fuse terminating in said lower chamber.

4. Apparatus of the class described, comprising a cylindrical container, said container comprising a cylindrical wall member and a base member having an annular cylindrical flange adhesively secured to said cylindrical wall member, a reinforcing disc overlying said base within said container, a removable cover for said container, aligned apertures in the wall of said container and the flange of said base member and a fuse extending therethrough into said container, the portion of said fuse outside of said container extending longitudinally thereof, a label wrapper extending circumferentially of said container, said wrapper extending over said fuse and securing said fuse against the outer surface of said container.

5. A device for pollination of trees comprising a cylindrical member, a base having an annular flange fixedly secured to one end of said member, a removable, diaphragm disc extending transversely of said member and dividing the same into two compartments, a powder charge contained in one of said compartments next adjacent said base, a dry, finely divided powder including a quantity of pollen in the second of said compartments, a removable cover for the end of said member opposite said base, and fuse means for igniting said powder charge extending through said flange and said cylindrical member, the inner end of said fuse means terminating in the powder charge containing compartment.

6. Apparatus of the class described comprising a cylindrical wall member, a base member having an annular cylindrical flange adhesively secured to one end of said wall member, a relatively heavy reinforcing disc overlying said base member, the peripheral edge of said disc fitting snugly against the inner wall of said cylindrical member, a removable cover for the end of said cylindrical wall member opposite said base member, an imperforate partition disc extending transversely of said cylindrical member and fitting snugly against the inner wall thereof, said partition disc being spaced from said reinforcing disc to define a chamber for holding a charge of explosive material, a pair of aligned apertures in the cylindrical wall member and the flange of said base member communicating with said chamber, a fuse extending in a snugly fitting relation through said apertures, the inner end of said fuse terminating in said chamber, the outer end portion of said fuse being folded against the outer surface of said cylindrical wall member, and a label wrapper extending around the outside of said cylindrical wall member and securing said fuse thereagainst.

ROBERT E. BLAIR.

REFERENCES CITED

The following references are of record in the file of this patent:

UNITED STATES PATENTS

| Number | Name | Date |
|---|---|---|
| 954,591 | Rogers | Apr. 12, 1910 |
| 1,509,208 | Hull | Sept. 23, 1924 |
| 1,528,664 | Ferraguti | Mar. 3, 1925 |
| 1,784,243 | Moffet | Dec. 9, 1930 |
| 1,854,449 | Collins | Apr. 19, 1932 |
| 2,028,217 | Huffman | Jan. 21, 1936 |
| 2,324,801 | Patton | July 20, 1943 |
| 2,430,659 | Antles | Nov. 11, 1947 |

FOREIGN PATENTS

| Number | Country | Date |
|---|---|---|
| 437,886 | Great Britain | Nov. 4, 1935 |
| 450,462 | Great Britain | July 16, 1936 |

OTHER REFERENCES

Intern. Sugar J., vol. 22 (1920), p. 310.

Nat. Pecan Assoc. Bul., vol 31 (1933), p. 84.